United States Patent
Nayak et al.

(10) Patent No.: US 12,223,475 B2
(45) Date of Patent: Feb. 11, 2025

(54) AUTO INSTALLMENTS VIA SMART CONTRACTS ON BLOCKCHAIN

(71) Applicant: NCR Atleos Corporation, Atlanta, GA (US)

(72) Inventors: Dinesh Kumar Nayak, Berhampur (IN); Krishna Kumari, Berhampur (IN)

(73) Assignee: NCR Atleos Corporation, Atlanta, GA (US)

( * ) Notice: Subject to any disclaimer, the term of this patent is extended or adjusted under 35 U.S.C. 154(b) by 253 days.

(21) Appl. No.: 18/071,841

(22) Filed: Nov. 30, 2022

(65) Prior Publication Data

US 2024/0177125 A1    May 30, 2024

(51) Int. Cl.
  *G06Q 20/10*    (2012.01)
  *G06Q 20/22*    (2012.01)
  *G06Q 20/38*    (2012.01)
  *G06Q 20/40*    (2012.01)

(52) U.S. Cl.
  CPC ........... *G06Q 20/102* (2013.01); *G06Q 20/29* (2013.01); *G06Q 20/3825* (2013.01); *G06Q 20/389* (2013.01); *G06Q 20/4014* (2013.01); *G06Q 2220/00* (2013.01)

(58) Field of Classification Search
  CPC .. G06Q 20/102; G06Q 20/29; G06Q 20/3825; G06Q 20/389; G06Q 20/4014; G06Q 2220/00; G06Q 20/14; G06Q 20/3821; G06Q 20/227; G06Q 20/38215; G06Q 40/03
  See application file for complete search history.

(56) References Cited

U.S. PATENT DOCUMENTS

| | | | |
|---|---|---|---|
| 11,250,407 B2 * | 2/2022 | Chen | G06Q 20/40 |
| 11,308,487 B1 * | 4/2022 | Foster | G06Q 20/3829 |
| 2018/0108008 A1 * | 4/2018 | Chumbley | G06Q 20/3674 |
| 2022/0368593 A1 * | 11/2022 | Shankar | H04L 41/0893 |
| 2022/0383325 A1 * | 12/2022 | Hoffman | G06Q 20/4018 |

(Continued)

OTHER PUBLICATIONS

Virtual Prepaid Card System (Year: 2019).*
Data Processing Method Based on Blockchain and Related Device (Year: 2021).*

*Primary Examiner* — Radu Andrei
*Assistant Examiner* — Nakia Leffall-Allen
(74) *Attorney, Agent, or Firm* — Schwegman Lundberg & Woessner, P.A.

(57) ABSTRACT

A network-based service creates a smart contract on a blockchain on behalf of a user who has a loan or a subscription that requires installment payments be collected by a provider from the user and provided to creditor of the loan or subscription. The smart contract associates a default account of the user with a first access token and non-default registered other accounts of the user with a second access token. The smart contract when presented with the access tokens from a provider determines whether the payment due can be satisfied from a current balance of the default account and if so, transfers the payment from the default account to the provider. If the default lacks sufficient funds for the payment, the smart contract proportions the amounts taken from each of the accounts to reach the amount due and transfers the amount due to the provider.

20 Claims, 4 Drawing Sheets

(56) References Cited

U.S. PATENT DOCUMENTS

| | | | |
|---|---|---|---|
| 2023/0094097 A1* | 3/2023 | Hopkins | H04L 63/10 |
| | | | 726/9 |
| 2023/0377034 A1* | 11/2023 | Ball | G06Q 50/188 |
| 2024/0029036 A1* | 1/2024 | Bennett | G06Q 20/223 |

* cited by examiner

AUTO INSTALLMENTS VIA SMART CONTRACTS ON BLOCKCHAIN

BACKGROUND

Equated monthly installment (EMI) are loans established by financial Institutions (FIs) for consumers. EMI can also be associated with recurring subscription fees of a consumer with a provider. Additionally, some debit card arrangements allow EMI payments even when the consumer lacks the funds in the bank account to cover a purchase. This is useful to the consumer making purchases with credit when their bank account has insufficient funds to cover the purchases.

Often the financial institutions require the consumers to provide an e-mandate, which links a consumers financial account to the loan or subscription and provides authorization for the FI to auto withdraw the monthly minimum payment from that bank account. E-mandates or auto transfer authorization allows FIs to collect funds from consumers without reminders and without extensive paperwork; consumers also do not have to worry about missing a payment.

The FI collects the funds and pays the corresponding debt holder, which may be another bank associated with the consumer's debit card or which may be a subscription service. E-mandates and auto transfers permit digital transfers of consumer loan or subscription payments directly from the consumer's financial account to the creditor using an e-mandate producer.

However on the payment date for a loan or a subscription, if a consumer does not have a sufficient balance in the bank account being used for payment, the auto transfer payment fails, and the consumer must pay a penalty fee to both the e-mandate producer authority and the creditor associated with the loan or subscription. Lacking sufficient funds to cover a monthly payment also negatively impacts a consumer's credit report.

SUMMARY

In various embodiments, methods and a system for auto installment payments via smart contracts on a blockchain are presented. A user registers accounts of the user that are to be used as payment sources for an installment payment owed by the user to a creditor through a provider. The user is provided a secure token which is presented by the user to a cloud-based service for establishing a smart contract on a blockchain that includes the registered accounts, terms of the installment payments, and other customer conditions. The cloud service provides the user with a first access token linked to a default account for the user and a second access token linked to the other registered accounts of the user which are not the default account. The user provides the first access token and the second access token to the provider. The provider accesses the smart contract on the blockchain using the secure token and provides the first access token. The smart contract determines whether a current account balance of the default account linked to the first access token has sufficient funds to cover the installment payment due to the provider and if so, transfers the payment due to an account associated with the provider or the creditor on behalf of the user. When the default account lacks sufficient funds, the provider provides the smart contract with the second access token and the smart contract calculates a percentage of the payment amount due to take from each of the accounts and transfers the corresponding funds from the accounts to an account associated with the provider or the creditor.

DETAILED DESCRIPTION

Figure 1:
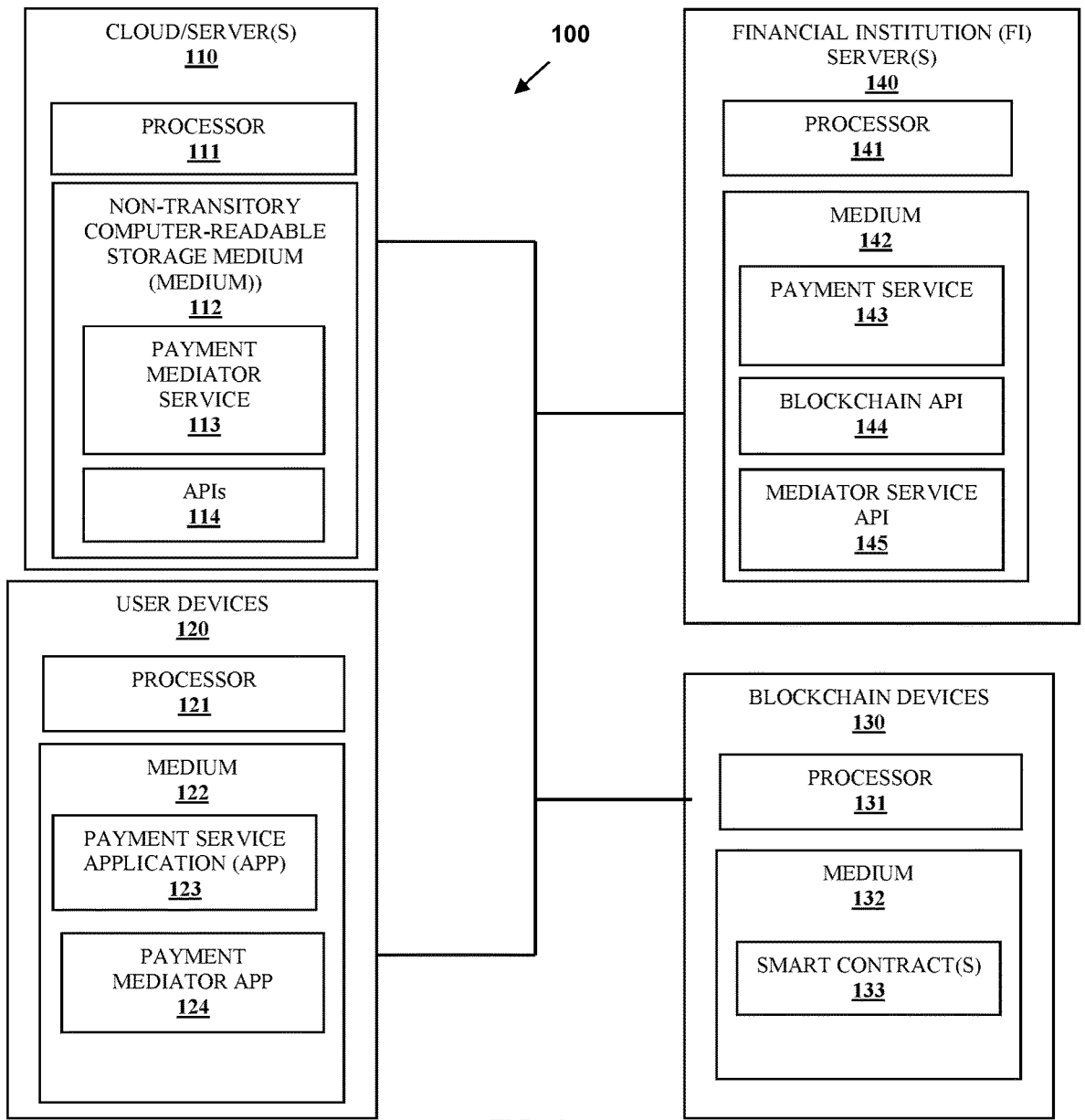
FIG. 1 is a diagram of a system for auto installment payments via smart contracts on a blockchain, according to an example embodiment.

When a user takes a loan from a bank or a subscription from a server, either the user or the bank sets up a mandate for auto monthly bank transfers from a bank account of the user to the creditor of the loan or the subscription. This can be done through paperwork or electronically using an e-mandate. On the payment due date, the mandate is presented to the registered bank account and when there are insufficient funds to cover the payment, the mandate is rejected and fails. The user has to pay a penalty (similar to bouncing a check) to both the creditor and the FI that set up the mandate or auto monthly transfer payment. The creditor reports these events to the credit bureau, which creates a negative impact on the user's credit worthiness.

The user may actually have multiple different bank accounts when an auto transfer payment fails on a specific one of the user's bank account. Moreover, the user's bank account that lacked sufficient funds may have only lacked sufficient funds by a very small amount, such as less than a dollar. These circumstances are irrelevant and not accounted for in the existing auto transfer payment process. Unfortunately for the user, the amount the user was short and the fact that the user had other accounts to fully cover the payment are irrelevant and the user is stuck with fees to two entities plus the required installment payment to the creditor.

The teachings provided herein and below obviate these issues by providing a secure mechanism by which users can register their existing bank accounts on a blockchain. Once registered, a FI issuing authority for a consumer card provides the user with a first secure token. The user is authorized with the first secure token to establish a smart contract on the blockchain. The user establishes the smart contract through a cloud-based service using the first secure token. The service configures and installs the smart contract on the blockchain and provides the user with two access tokens. The first access token authorizes the requestor to take payments from a default account of the user and the second access token authorizes the requestor to pool funds from other registered accounts in the user's blockchain.

When a requestor (mandate or auto payment provider) wants to collect an installment payment, the first access token is presented to the smart contract, assuming the default account has sufficient funds for the balance, the requestor transfers the installment payment from the default account and pays the corresponding creditor to a transfer to the creditor's account made on behalf of the user. When the smart contract indicates there is insufficient funds in the default account, the requestor presents the second access token associated with other registered accounts of the user. The smart contract then pools funds from the default account and the other accounts in a calculated proportion and provides the pooled funds back to the requestor and the requestor transfers the pooled funds in the amount of the installment payment to an account associated with the creditor on behalf of the user.

Any consumer with an EMI or auto installment loan or subscription can securely benefit from the teachings provided herein by utilizing all available accounts instead of a single account for the installment payments. The EMI or auto installment provider (requestor) timely receives funds from the consumer to make payment to the consumer's creditor. No fees are charged by the provider or the creditor when the consumer's pooled funds are sufficient to cover a monthly installment payment.

Various embodiments of the teachings are now presented with initial reference to FIG. 1. FIG. 1 is a diagram of a system 100 for auto installment payments via smart contracts on a blockchain, according to an example embodiment. It is to be noted that the components are shown schematically in greatly simplified form, with only those components relevant to understanding of the embodiments being illustrated.

Furthermore, the various components are illustrated, and the arrangement of the components is presented for purposes of illustration only. It is to be noted that other arrangements with more or fewer components are possible without departing from the teachings of auto installment payments via smart contracts on a blockchain, presented herein and below.

As used herein, the terms "user," "debtor," and "consumer" may be used interchangeably and synonymously. This refers to an individual that has a loan or a subscription and has set up an e-mandate or an authorization for automatic installment payments to a creditor associated with the loan or subscription through a provider. A "provider" is a FI that is servicing an e-mandate or an auto installment payment service on behalf of a debtor and the debtor's creditor. A "creditor" can be a FI or a retailer that provides goods or services, such as subscriptions.

An "account" has used herein refers to a financial account from which funds can be transferred to satisfy all or a portion of an installment payment for a loan or a subscription of a consumer. The account can be a FI bank account, a debit card linked to a FI account, or a credit card account that authorizes fund withdrawals.

Cryptocurrency and non-fungible tokens (NFTs) sellers and buyers have few options when selling or purchasing cryptocurrency/NFTs besides a large cryptocurrency exchange. Peer-to-Peer (P2P) transactions between a seller and a buyer is not secure and is not safe. Embodiments, presented herein and below, provides a service by which P2P transactions are decentralized, secure, and efficient. The parties to a transaction experience no risk of loss and do not have to wait for days once a payment obligation of the transaction is satisfied. The service itself does not experience any risk associated with cryptocurrency/NFTs transactions as it only holds assets associated with a transaction in escrow on behalf of the parties. Thus, the enterprise associated with the service does not maintain any volatile assets on its balance sheet and does not run afoul of any governmental regulations with respect to cryptocurrency/NFTs. The enterprise may charge a small fee for the service or may offer it for free to customers as a value-added service.

System 100 includes at least one cloud/server 110, user-operated devices 120, blockchain devices 130, and one or more FI servers 140. Cloud/server 110 includes a processor 111 and a non-transitory computer-readable storage medium 112. Medium 112 includes executable instructions for a payment mediator service 113 and Application Programming Interfaces (APIs) 114, which when executed by processor 111 in turn causes processor 111 to perform operations discussed herein and below with respect to 113 and 114.

Each user-operated device 120 includes a processor 121, a non-transitory computer-readable storage medium 122. Medium 122 includes executable instructions for a service application (app) 123 and a payment mediator (app) 124, which when executed by processor 121 causes processor 121 in turn to perform operations discussed herein and below for 123 and 124.

Blockchain devices include processors 131 and a non-transitory computer-readable storage mediums 132. Mediums 132 includes executable instructions for smart contracts 133, which when executed by the processors 131 cause processors 131 in turn to perform operations discussed herein and below for smart contracts 133.

Each FI server 140 includes a processor 141 and a non-transitory computer-readable storage medium 142. Medium 142 includes executable instructions for a payment service 143, blockchain API 144, and, optionally, a mediator service API 145, which when executed by processor 141 in turn causes processor 141 to perform operations discussed herein and below with respect to 143-145.

Initially, users download payment service app 123 and payment mediator app 124 to their devices 120. Alternatively, one or more users utilize a web browser of device 120 that provides service app 123 and/or payment mediator app 124 through web pages and plugins to the browser. The users accesses a user interface of app 123 to interacted with payment service 143 for purposes of registering each available account of the user for use on the blockchain (BC) 130. Once the accounts are registered, payment service 143 interacts through mediator service API 145 to provide the registered accounts, the user identifier, and conditions or terms of the user's agreement with the FI as a provider that collects installment payments on behalf of the user and a creditor.

Payment mediator service 113 returns a first secure token back to payment service 143 through API 145. Payment service 143 provides the first secure token to the user interface of app 123 for the user to use to establish a smart contract 133 on the BC 130 through payment mediator service 113.

The user accesses a user interface of payment mediator app 124 and provides the first secure token back to payment mediator service 113. Payment mediator service 113 links the first secure token to the registered accounts, the user, and the installment payment agreement between the user and the provider associated with FI server 140. Payment mediator service 113 requests that the user identify a default account from the list of registered accounts. Payment mediator service 113 generates two secure access tokens, the first secure access token provides authorization to take installment payment funds from the user-identified default account and the second secure access token provides authorization to take installment payment funds from the other registered accounts that were not designated as the default account.

Payment mediator service 113 generates instructions for a smart contract 133 that is identified over the BC 130 by the initial first secure token provided by the provider through the payment service 143 during account registrations by the user. The instructions include caveats or conditions that identify the amount of the installment payment, the length of the installment payment, etc. The conditions link the first access token to the default account and the second access token to the other non-default registered accounts. The executable instructions with the conditions are then instantiated as the smart contract 133 on the BC 130 accessible from a location on the BC 130 linked to the first secure token provided during account registrations.

The user accesses the user interface of app 122 and interacts with payment service 143 to provide the first and second access tokens. The payment service 143 was already provided the first secure token from payment mediator service 113 such that the first secure token is already linked to the user identifier of the user and the user's installment payment agreement with the provider associated with payment service 143.

When a payment due date is identified for the user's installment payment agreement, payment service 143 uses the first secure token to access the smart contract 133 and provides the smart contract as input the first access token using BC API 144. The smart contract 133 includes instructions to verify that the first access token is authentic and to check a current balance in the default account. Assuming the default account has a sufficient balance to cover the installment payment amount due, smart contract 133 transfers the installment payment amount from the default account to an account linked to the provider or linked to a creditor associated with the installment payments. The provider or creditor account can be preconfigured in the instructions of the smart contract 133 or provided as additional input provided by the payment service 143 to the smart contract 133.

When the default account has less than the total amount due for the installment payment, the smart contract notifies payment service 143 through BC API 144 and in response payment service 143 provides back the second access token using BC API 144. The smart contract 133 further includes instructions for automatically calculating what portions of funds from the default account and the non-default accounts are to be used to provide the payment service 143 the full installment payment due by the user. This can be done in a variety of manners.

For example, the instructions of the smart contract 133 can evaluate account histories associated with the registered accounts in view of historical balances and current balances in each registered account to calculate the percentage of the payment due taken from each of the accounts. A percentage of the payment due is then allocated to each of the accounts and the smart contract 133 transfers the corresponding funds by assigned percentage of the payment due from the corresponding accounts to an account associated with the provider or creditor to satisfy the installment payment due in full.

In an embodiment, the user can assign priorities through a profile to each of the registered accounts or assign rules, which are processed by the instructions of the smart contract 133 to determine the percentages of the payment due taken from each account. In an embodiment, the user can access the user interface of app 123 at any time and change rules and/or priorities even after the smart contract 133 is executing on the BC 130.

In an embodiment, smart contract 133 can utilize a machine-learning model (MLM) that receives as input the account histories and balances of the registered accounts, current balances of the registered accounts, and the payment due amount. The MLM produces as output a specific amount to take from each of the accounts to obtain the full payment due.

In an embodiment, API 145 can be processed by the provider to interact with mediator service 113 and delegate the first and second access tokens to a different provider. This is useful when providers change. It is noted that conditions associated with the installment payments for the loan or subscription cannot be changed by any provider after initial creation of the first secure token by payment mediator service 113. This ensures that the terms of the user's loan agreement or subscriber agreement are not unilaterally altered by providers without the user's consent.

The smart contract 133 denies an installment payment due only if a total of all the current balances for the registered accounts of the user are insufficient to cover the installment payment due. This reduces the likelihood that the user will be hit with fees from the provider and creditor and ensures that creditors are timely receiving the amounts due to them by the user.

In an embodiment, payment mediator service 113 can charge a service fee to the provider, the creditor, and/or the user. Service 113 can also charge a monthly and/or usage-based fee to the provider and/or creditor. In an embodiment, service 113 charges no fees and is provided as a value-added service to the users, the providers, and the creditors.

Figure 2A:
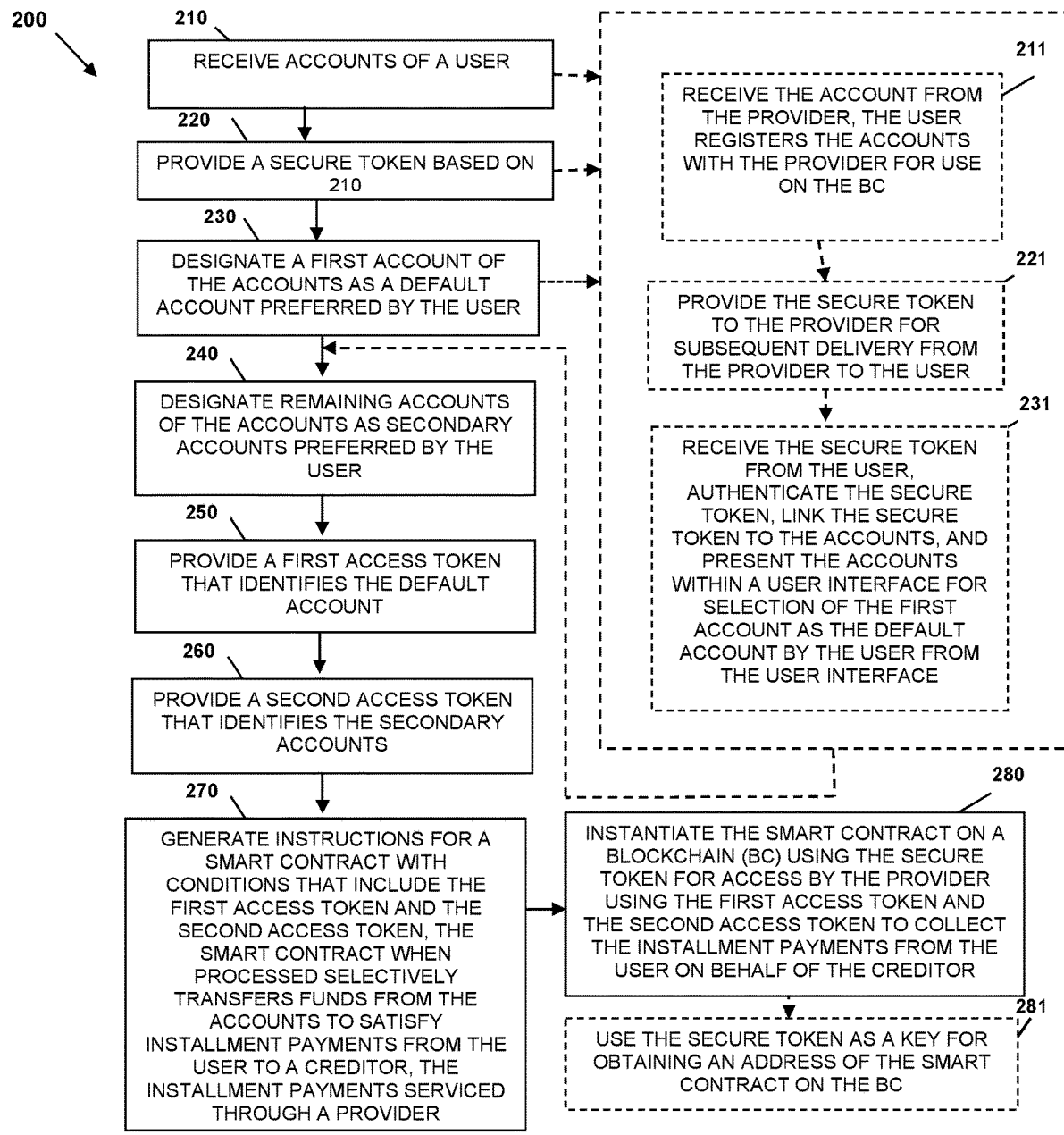
FIG. 2A is a diagram of a method for auto installment payments via smart contracts on a blockchain, according to an example embodiment.
Figure 2B:
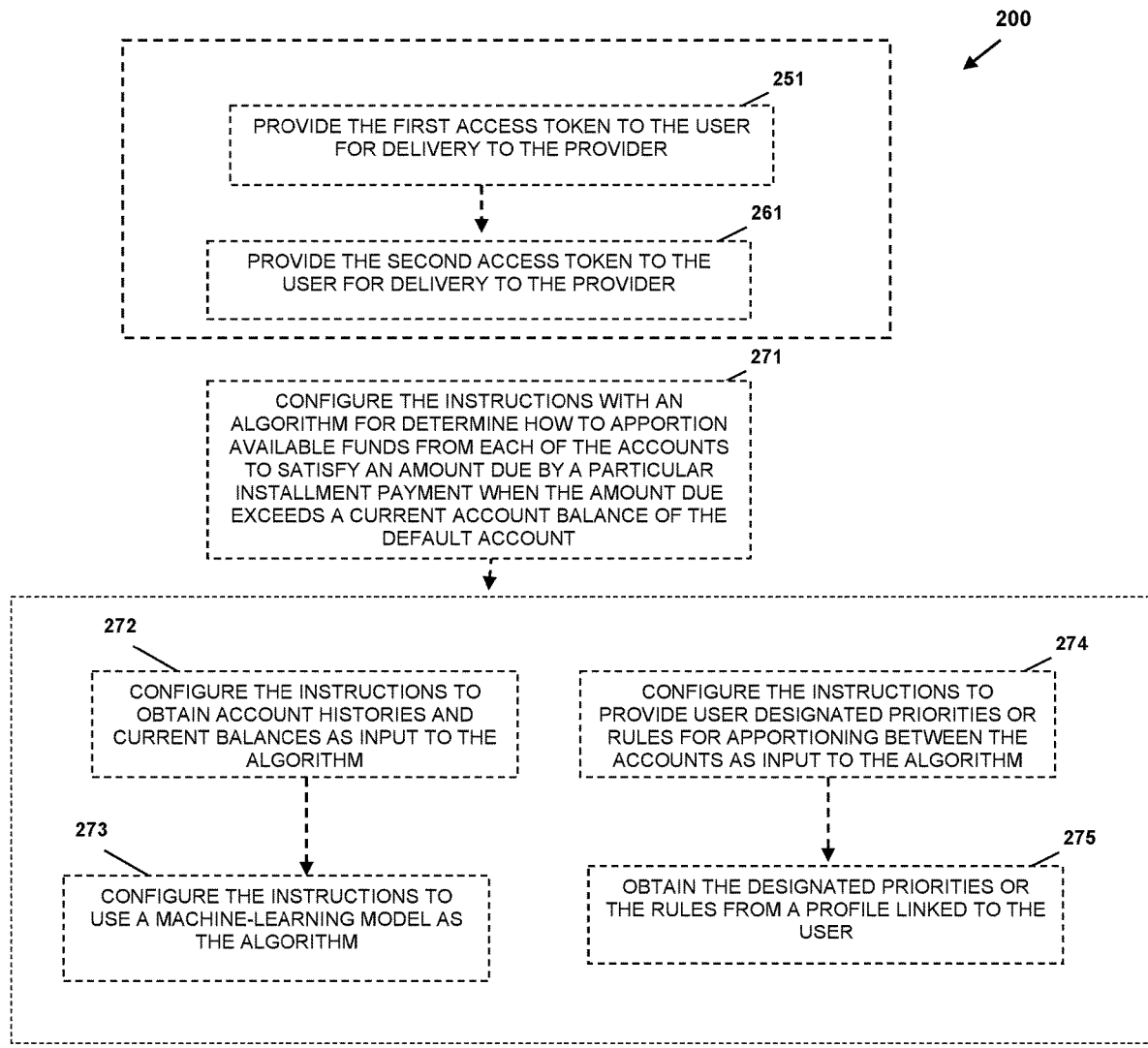
FIG. 2B is a diagram of embodiments for the method of FIG. 2A.

The above-referenced embodiments and other embodiments are now discussed with reference to FIGS. 2A, 2B, and 3. FIGS. 2A and 2B are diagrams of a method 200 auto installment payments via smart contracts on a blockchain, according to an example embodiment. The software module(s) that implements the method 200 is referred to as a "payment mediator service." The payment mediator service is implemented as executable instructions programmed and residing within memory and/or a non-transitory computer-readable (processor-readable) storage medium and executed by one or more processors of a device or set of devices. The processor(s) of the device(s) that executes the payment mediator service are specifically configured and programmed to process the payment mediator service. The payment mediator service may have access to one or more network connections during its processing. The network connections can be wired, wireless, or a combination of wired and wireless.

In an embodiment, the payment mediator service executes on cloud 110 or server 110. In an embodiment, the payment mediator service executes on a FI server 140.

In an embodiment, the payment mediator service is one, all, or some combination of 113 and/or 114. In an embodiment, payment mediator service presents another, and in some ways, an enhanced processing perspective from that which was discussed above with system 100.

At 210 (shown in FIG. 2A), the payment mediator service receives accounts of a user. These are registered accounts or account identifiers including FI routing numbers and account numbers.

In an embodiment, at 211 (shown in FIG. 2A), the payment mediator service receives the accounts from a provider. The user registers the accounts with the provider for use on the BC. The provider services installment payments made by the user to a creditor for a user loan or a user subscription.

At 220 (shown in FIG. 2A), the payment mediator service provides a secure token based on 210. That is, the registered accounts are used to generate a unique secure token that is linked to the registered accounts and provided to the provider and/or the user.

In an embodiment of 211 and 220, at 221 (shown in FIG. 2A), the payment mediator service provides the secure token to the provider for subsequent delivery to the user. That is, the user initially registers the accounts with the provider, the provider provides the registered accounts and user identifier to the payment mediator service, and the payment mediator service returns the secure token to the provider, which the provider provides to the user during registration of the accounts.

At 230 (shown in FIG. 2A), the payment mediator service designates a first account of the accounts as a default account preferred by the user. The default account is the account that is primarily to be used to make the user's installment payments.

In an embodiment of 221 and 230, at 231 (shown in FIG. 2A), the payment mediator service receives the secure token from the user. The payment mediator service authenticates the secure token, links the secure token to the registered accounts, and presents the registered accounts within a user interface for selection of the first account as the default account by the user from the user interface.

At 240 (shown in FIG. 2A), the payment mediator service designates remaining accounts of the accounts as secondary accounts preferred by the user. Once the first and default account is known, the payment mediator service can designate the remaining accounts as the secondary accounts of the user.

At 250 (shown in FIG. 2A), the payment mediator service provides a first access token that identifies the default account. In an embodiment, at 251 (shown in FIG. 2B), the payment mediator service provides the first access token to the user for delivery by the user to the provider. At 260 (shown in FIG. 2A), the payment mediator service provides a second access token that identifies the secondary accounts as a whole, that is a single second access token is associated and linked to each of the secondary accounts. In an embodiment of 251 and 260, at 261 (shown in FIG. 2B), the payment mediator service provides the second access token to the user for subsequent delivery to the provider.

At 270 (shown in FIG. 2A), the payment mediator service generates instructions for a smart contract with conditions that include the first access token and the second access token. The smart contract when processed selectively transfers funds from the registered accounts to satisfy installment payments from the user to a creditor. The installment payments are serviced on behalf of the user and creditor by the provider.

In an embodiment, at 271 (shown in FIG. 2B), the payment mediator service configures the instructions with an algorithm for determining how to apportion available funds from each of the accounts necessary to satisfy an amount due by a particular installment payment. This is processed when the amount due for the particular installment payment exceeds a current account balance of the default account.

In an embodiment of 271 and at 272 (shown in FIG. 2B), the payment mediator service configures the instructions to obtain account histories and current balances as input to the algorithm. In an embodiment of 272 and at 273 (shown in FIG. 2B), the payment mediator service configures the instructions to use a MLM as the algorithm, which is provided the account histories, the current balances, and the amount due as input and which provides as output an apportioned amount from each account to transfer to an account associated with the provider or the creditor.

In an embodiment of 271 and at 274 (shown in FIG. 2B), the payment mediator service configures the instructions to provide user designated priorities or rules for apportioning between the accounts as input to the algorithm. In an embodiment of 274 and at 275 (shown in FIG. 2B), the payment mediator service obtains the designated priorities or the rules from a profile linked to the user.

At 280 (shown in FIG. 2A), the payment mediator service instantiates the smart contract with the configured instructions on the BC using the secure token for access by the provider. The provider uses the first access token and the second access token to collect the installment payments from the user on behalf of a creditor.

In an embodiment, at 281 (shown in FIG. 2A), the payment mediator service uses the secure token as a key for obtaining an address of the smart contract on the BC. That is, the secure token is an encrypted BC address for the smart contract.

The smart contract executes the instructions on the BC. This is done autonomously once the payment mediator service instantiates the smart contract on the BC.

Figure 3:
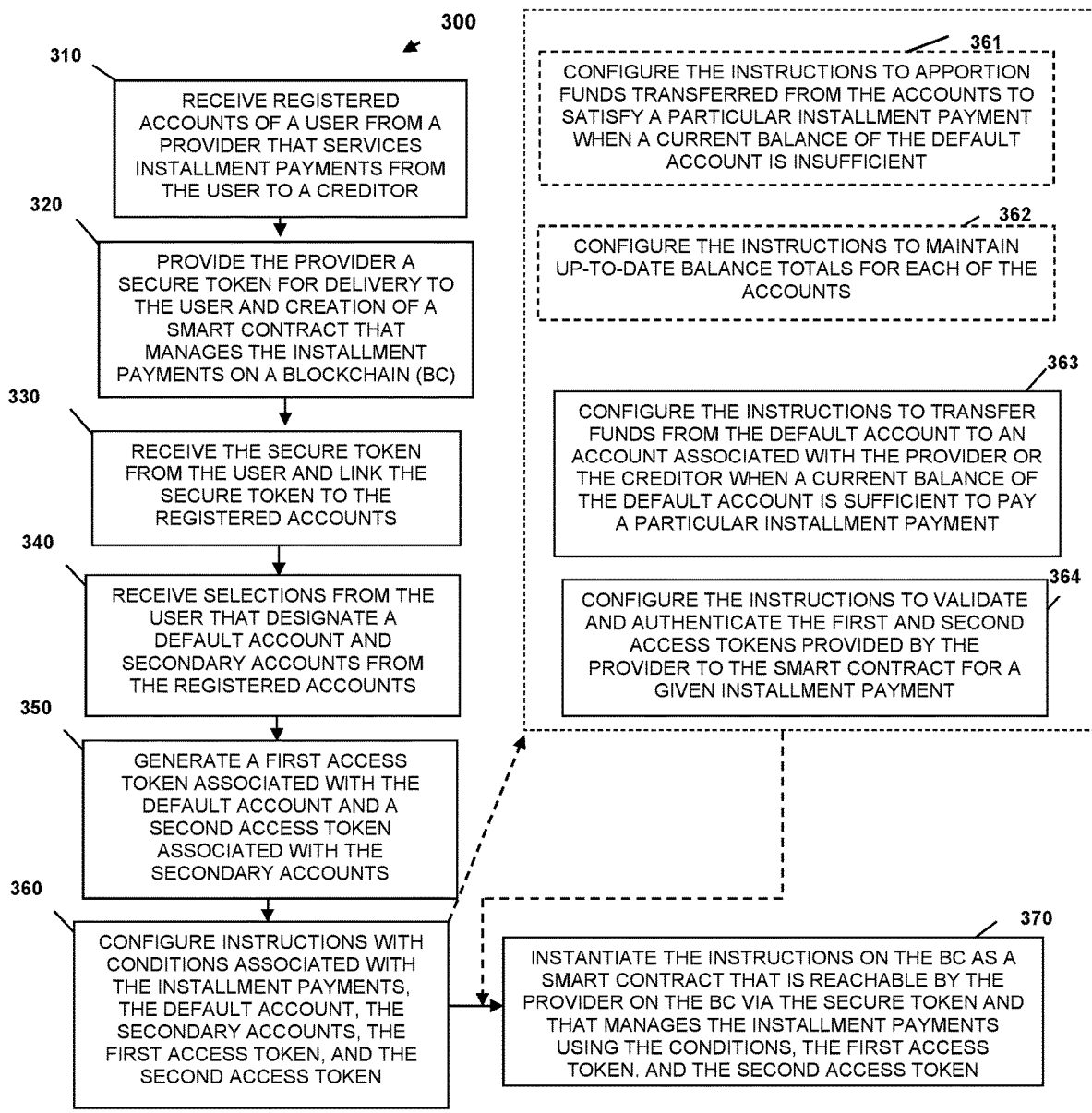
FIG. 3 is a diagram of another method for auto installment payments via smart contracts on a blockchain, according to an example embodiment.

FIG. 3 is a diagram of a method 300 auto installment payments via smart contracts on a blockchain, according to an example embodiment. The software module(s) that implements the method 300 is referred to as a "BC payment mediator service." The BC payment mediator service is implemented as executable instructions programmed and residing within memory and/or a non-transitory computer-readable (processor-readable) storage medium and executed by one or more processors of a device or set of devices. The processor(s) of the device that executes the BC payment mediator service are specifically configured and programmed to process the BC payment mediator service. The BC payment mediator service may have access to one or more network connections during its processing. The network connections can be wired, wireless, or a combination of wired and wireless.

In an embodiment, the device that executes the BC payment mediator service is cloud 110 or server 110. In an embodiment, the device that executes the BC payment mediator service is a FI server 140.

In an embodiment, the BC payment mediator service is all of, or some combination of, 113, 114, 133, and/or method 200. The BC payment mediator service presents another and, in some ways, an enhanced processing perspective from that which was described above for system 100 and method 200.

At 310, the BC payment mediator service receives registered accounts of a user from a provider. The provider services installment payments being made from the user to a creditor in connection with a user loan or a user subscription service.

At 320, the BC payment mediator service provides the provider a secure token for delivery to the user and creation of a smart contract that manages the installment payments on the BC. At 330, the BC payment mediator service receives the secure token from the user and the BC payment mediator service links the secure token to the registered accounts received for the user at 310.

At 340, the BC payment mediator service receives selections from the user that designate a default account and secondary accounts from the registered accounts. It is noted that this may be just a single selection made by the user through a user interface that identifies the default account with the secondary accounts assumed to be those registered accounts that are not the default account.

At 350, the BC payment mediator service generates a first access token associated with the default account. The BC payment mediator service also generates a second access token that associated with the secondary accounts as a whole.

At 360, the BC payment mediator service configures instructions with conditions associated with the installment payments, the default account, the secondary accounts, the first access token, and the second access token. In an embodiment, the user can provide some customer conditions through the user interface to the BC payment mediator service.

In an embodiment, at 361, the BC payment mediator service configures the instructions to apportion funds transferred from the accounts to satisfy a particular installment payment when a current balance of the default account is insufficient. When the current balance of the default account is sufficient to cover the particular installment payment, the instructions are configured to transfer the payment from the default account to an account associated with the provider or the creditor.

In an embodiment, at 362, the BC payment mediator service configures the instructions to maintain up-to-date balance totals for each of the accounts. That is, at any given point in time when an installment payment is requested by a provider, the current balances of the accounts are updated in real time.

In an embodiment, at 363, the BC payment mediator service configures the instructions to transfer funds from the default account to an account associated with the provide or the creditor when a current balance of the default account is sufficient to pay a particular installment payment. This was stated before, it is just when the default account lacks all the necessary funds to cover a payment that the BC payment mediator service calculates an apportionment of funds from each of the accounts to transfer. This is done to ensure that based on user patterns with the account histories that no single user account is overly drained when a given payment is made on behalf of the user.

In an embodiment, at 364, the BC payment mediator service configures the instructions to validate and authenticate the first and second access tokens provided by the provider to the smart contract for a given installment payment. Each access token may include signatures or encrypted values that permit the BC payment mediator service to authenticate the provider and the token itself as being created by the BC payment mediator service and not modified thereafter.

At 370, the BC payment mediator service instantiates the instructions on the BC as a smart contract that is reachable by the provider on the BC via the secure token. The smart contract autonomously manages the installment payments using the conditions, the first access token, and the second access token.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner. The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving accounts of a user;
   providing a secure token based on the receiving;
   designating a first account of the accounts as a default account preferred by the user;
   designating remaining accounts of the accounts as secondary accounts preferred by the user;
   providing a first access token that identifies the default account;
   providing a second access token that identifies the secondary accounts;
   generating instructions for a smart contract with conditions that include the first access token and the second access token, wherein the smart contract when processed selectively transfers funds from the accounts to satisfy installment payments from the user to a creditor, wherein the installment payments are serviced through a provider;
   and
   instantiating the smart contract on a blockchain using the secure token for access by the provider using the first access token and the second access token to collect the installment payments from the user on behalf of the creditor.

2. The method of claim 1, wherein receiving further includes receiving the account identifiers from the provider, wherein the user registers the accounts with the provider for use on the blockchain.

3. The method of claim 2, wherein providing secure token further includes providing the secure token to the provider for subsequent delivery from the provider to the user.

4. The method of claim 3, wherein designating the first account further includes receiving the secure token from the user, authenticating the secure token, linking the secure token to the accounts, and presenting the accounts within a user interface for selection of the first account as the default account by the user from the user interface.

5. The method of claim 4, wherein providing the first access token further includes providing the first access token to the user for delivery to the provider.

6. The method of claim 5, wherein providing the second access token further includes providing the second access token to the user for delivery to the provider.

7. The method of claim 1, wherein generating further includes configuring the instructions with an algorithm for determining how to apportion available funds from each of the accounts to satisfy an amount due by a particular installment payment when the amount due exceeds a current account balance of the default account.

8. The method of claim 7, wherein configuring further includes configuring the instructions to obtain account histories and current balances of the accounts as input to the algorithm.

9. The method of claim 8, wherein configuring further includes configuring the instructions to use a machine-learning model as the algorithm.

10. The method of claim 7, configuring further includes configuring the instructions to provide user designated priorities or rules for apportioning between the accounts as input to the algorithm.

11. The method of claim 10, wherein obtaining the designated priorities or the rules from a profile linked to the user.

12. The method of claim 1, wherein instantiating further includes using the secure token as a key for obtaining an address of the smart contract on the blockchain.

13. A method, comprising:
receiving registered accounts of a user from a provider that services installment payments due from the user to a creditor;
providing the provider a secure token for delivery to a user and creation of a smart contract that manages the installment payments on a blockchain;
receiving the secure token from the user and linking the secure token to the registered accounts;
receiving selections from the user that designate a default account and secondary accounts from the registered accounts;
generating a first access token associated with the default account and a second access token associated with the secondary accounts;
configuring instructions with conditions associated with the installment payments, the default account, the secondary accounts, the first access token, and the second access token;
instantiating the instructions on the blockchain as a smart contract that is reachable by the provider on the blockchain via the secure token and that manages the installment payments using the conditions, the first access token, and the second access token.

14. The method of claim 13, configuring further includes configuring the instructions to apportion funds transferred from the accounts to satisfy a particular installment payment when a current balance of the default account is insufficient to make the particular installment payment.

15. The method of claim 13, wherein configuring further includes configuring the instructions to maintain up-to-date balance totals for each of the accounts.

16. The method of claim 13, wherein configuring further includes configuring the instructions to transfer funds from the default account to an account associated with the provider or the creditor when a current balance of the default account is sufficient to pay a particular installment payment.

17. The method of claim 13, wherein configuring further includes configuring the instructions to validate and authenticate the first access token and the second access token provided by the provider to the smart contract for a given installment payment.

18. A system, comprising:
a server comprising at least one processor and a non-transitory computer-readable storage medium;
the non-transitory computer-readable storage medium comprises server executable instructions;
the executable instructions when executed by the at least one processor from the non-transitory computer-readable storage medium cause the at least one processor to perform operations comprising:
linking registered accounts of a user to a secure token;
identifying a default account from the registered accounts;
identifying remaining accounts that are not the default account as secondary accounts;
generating a first access token associated with the default account;
generating a second access token associated with the secondary accounts;
configuring instructions for a smart contract to manage installment payments made by the user through the registered accounts to a provider who collects the installment payments on behalf of a creditor of the user;
configuring the instructions to link the first access token to the default account and the second access token to the secondary accounts; and
installing and initiating the instructions as a smart contract on a blockchain accessible on the blockchain via the secure token, wherein the smart contract transfers funds for a particular installment payment from the default account of the user to an account associated with the provider or the creditor when a current balance of the default account is sufficient to cover the particular installment payment otherwise the smart contract apportions amounts from the registered accounts to cover the particular installment payment and transfers the corresponding amounts from the registered accounts to the account associated with the provider or the creditor.

19. The system of claim 18, wherein the operations further include configuring the instructions to obtain account histories and current balances for each of the registered accounts each time a given installment payment is requested by the provider.

20. The system of claim 18, wherein the operations further include configuring the instructions to validate and authenticate the first access token and the second access token provided by the provider with each requested installment payment.

* * * * *